United States Patent
Augesky

(10) Patent No.: US 7,372,187 B2
(45) Date of Patent: May 13, 2008

(54) METHOD AND DEVICE FOR CONTROL OF A CAPACITIVE ACTUATOR

(75) Inventor: Christian Augesky, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/590,948

(22) PCT Filed: Feb. 7, 2005

(86) PCT No.: PCT/EP2005/050508

§ 371 (c)(1),
(2), (4) Date: Aug. 28, 2006

(87) PCT Pub. No.: WO2005/083251

PCT Pub. Date: Sep. 9, 2005

(65) Prior Publication Data

US 2007/0183114 A1    Aug. 9, 2007

(30) Foreign Application Priority Data

Feb. 27, 2004  (DE) .................... 10 2004 009 614

(51) Int. Cl.
*H01L 41/09* (2006.01)
(52) U.S. Cl. ................................. 310/316.03
(58) Field of Classification Search ............ 310/316.03
See application file for complete search history.

(56) References Cited

U.S. PATENT DOCUMENTS

| | | | |
|---|---|---|---|
| 5,130,598 A | 7/1992 | Verheyen et al. | |
| 6,031,707 A | 2/2000 | Meyer | |
| 6,563,252 B2 | 5/2003 | Schrod | |
| 2002/0121958 A1 | 9/2002 | Schrod | |
| 2003/0067247 A1* | 4/2003 | Jansen et al. | ............... 310/317 |
| 2004/0169436 A1* | 9/2004 | Fukagawa et al. | .......... 310/317 |

FOREIGN PATENT DOCUMENTS

| | | |
|---|---|---|
| DE | 198 14 594 A1 | 10/1999 |
| DE | 199 21 456 A1 | 11/2000 |
| DE | 199 44 733 A1 | 3/2001 |
| DE | 199 52 950 A1 | 6/2001 |
| DE | 101 51 421 A1 | 5/2002 |
| DE | 101 58 553 A1 | 6/2002 |
| DE | 101 14 421 A1 | 10/2002 |
| WO | WO 01/33061 A1 | 5/2001 |

* cited by examiner

*Primary Examiner*—Thomas M. Dougherty
(74) *Attorney, Agent, or Firm*—Laurence A. Greenberg; Werner H. Stemer; Ralph E. Locher

(57) ABSTRACT

A piezoelectric actuator on an injection valve is controlled by application of a control curve, on which the maximum amplitudes for a current for controlling the actuator are given. A slowly rising or falling charge course at the beginning or end of a charging or discharging process and hence a linearly controllable charge level can thus be achieved over time. An overdriving of the actuator can thus be prevented.

12 Claims, 2 Drawing Sheets

METHOD AND DEVICE FOR CONTROL OF A CAPACITIVE ACTUATOR

BACKGROUND OF THE INVENTION

Field of the Invention

The invention relates to a method and a device for control of a piezoelectric actuation element, especially of a piezoelectric actuator for an injection valve of an internal combustion engine.

Major demands are made on the control electronics of the actuator for the control of capacitive actuators, i.e. for charging or discharging capacitive actuators. This means that voltages in the range of several 100 V and short-duration currents for charging and discharging of more than 10 A must be provided. The control is mostly undertaken in fractions of milliseconds. At the same time the current and the voltage is to be fed to the actuator in a controlled manner during these control phases.

One embodiment of a capacitive actuation element is represented by a piezoelectric actuator, as is used to actuate an injection valve. Such an injection valve is used in internal combustion engines for injecting fuel into a combustion chamber. Very high demands are imposed here on an exact and reproducible opening and closing of the valves and thereby also on the control of the actuator. To enable future exhaust emission limit values to be met, the number of fuel injections per combustion phase is increased. This means that the injection times and thereby also the activation times for a piezoelectric actuator become ever shorter, which imposes additional demands on the control electronics of the actuator.

In a known circuit arrangement (DE 199 44 733 A1) a piezoelectric actuator is charged by a charge capacitor via a transformer. To do this a charging switch arranged on a primary side of the transformer is controlled with a pulse-width-modulated control signal. The charging switch and also the discharging switch are embodied there as controllable semiconductor switches. Predefined energy packets are fed to the piezoelectric actuator or removed from it, for charging or discharging.

If energy packets are needed which are smaller than the predefined energy packets, the known circuit arrangement, for averaging out the energy fed to and removed from the piezoelectric actuator over time, needs a highly effective output filter. Furthermore identical charging and discharging currents are required here if the characteristic control curve of the actuator is not to exhibit any unevenness.

SUMMARY OF THE INVENTION

The object of the invention is to create a method and a device for controlling a capacitive actuator of which the outstanding features are a high resolution and reproducibility.

This object is achieved in accordance with invention by a method with the features of claim 1 as well as by a device with the features of claim 11.

In accordance with the inventive method the actuator is charged in at least three stages, each with a predefined duration. During these at least three periods a current flows into the actuator when the actuator is charged up.

During the first period an amplitude of the current is increased from a predefined minimum to a predefinable maximum. During the second period the amplitude of the current is kept approximately constant. Finally, during the third period, the amplitude of the current is reduced from a predefined maximum current to a likewise predefined final value.

The inventive device features a control unit and a final stage, with the final stage being controlled via a control signal of the control unit. The control unit makes a control signal available for a first predefined period which rises during this first period from a predefined minimum to a predefined maximum. For a second predefined period which follows the first period, the control unit makes a largely constant control signal available. For a third predefined period the control unit makes a control signal available which reduces over the third predefined period from the predefined maximum to a predefined end value.

The corresponding assumptions also apply for discharging the actuator. In this case the maximum amplitude of the current is also increased during the first period from a minimum to a maximum. During the second period the amplitude is kept constant and during the third period the amplitude of the current is reduced from a maximum to an end value which can also be predefined. In its case the discharge current is directed so that the energy stored in the actuator reduces.

Through the inventive control of the actuator a soft start and end sequence of the electrical charging fed to the actuator is achieved since for example, with a piezoelectric actuator, the charge being fed to this actuator is proportional to its change in travel and force change, a slow change of the charge over time in the start and end sequence of the charging or discharging prevents overdriving of the actuator. Disruptive mechanical or acoustic effects are reduced by this.

A control of the charge or discharge current is required exclusively for the period of the charging or discharging.

Advantageous developments of the invention are specified in the subclaims.

In the first preferred embodiment it is possible to set the charge fed to the actuator without any change in the overall charging period. Only the rises in the first and in the third period of the charging or discharging are changed here. By adapting the rise the linearity of the control can be influenced.

In a further preferred embodiment the amount of charge fed to the actuator is varied by a change to the second period. In this way, despite quantizing, as is induced for example by a clocked final stage, the actuator can be controlled in a linear manner. The first and/or third period remain unchanged here, which only shifts the power-down ramp in time and the power-down behavior remains the same.

This enables a further linear control range to be achieved. In this case changes of between 10 and 100% relation to the energy or 20 to 100% in relation to the time are possible. A linearity error of less than 0.5% is able to be implemented in this way. Different charging and discharging currents have no effect on the linearity of the control method.

In a preferred embodiment the control signal fed to the final stage produces a predefined output current. The control signal can be created by an analog or a digital circuit. Thus the form of the current fed to the actuator can then be set independently of the control of the final stage itself.

Advantageously the maximum amplitude of the current during the second period and the maximum of the third period approximately correspond to the predefined maximum of the first period.

In a further preferred exemplary embodiment the enveloping of the maximum amplitude over the three predefined periods approximately corresponds to the shape of a trapeze.

In a further preferred embodiment the charging or discharging current is an intermittent current which is made available for example by a clocked current or voltage source.

Furthermore the current can be made up of a series of pulses, of which the maximum amplitude lies at a predefined point of the envelope curve for this period in each case.

Triangular pulses are advantageously suitable for these pulses.

In a further preferred embodiment of the method the actuator is not controlled using gaps, i.e. the amplitude of the current continues to rise without pausing after a predefined minimum has been reached.

The invention is explained in more detail below on the basis of exemplary embodiments with reference to the schematic drawings.

DESCRIPTION OF THE PREFERRED EMBODIMENTS

Figure 1:
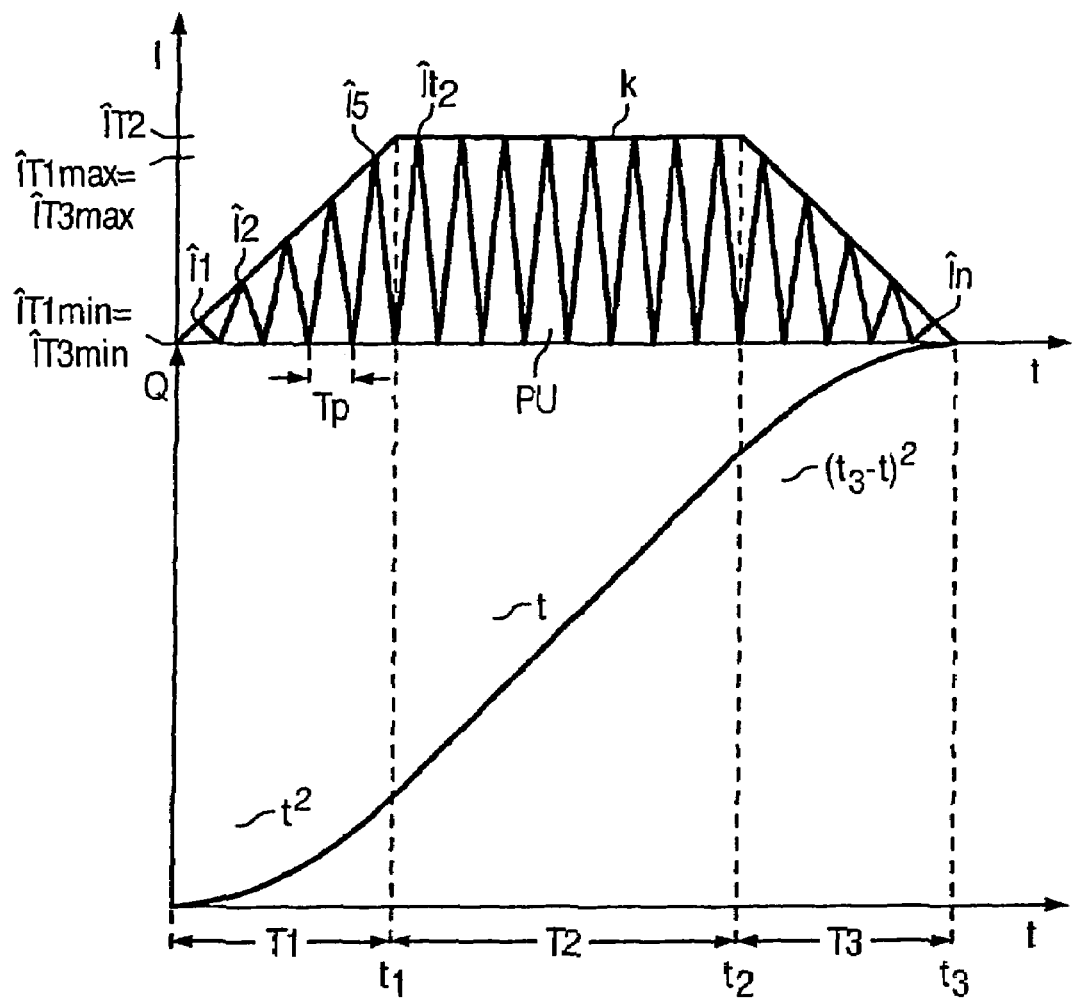
FIG. 1 an exemplary embodiment of a curve of the current fed to an actuator and the resulting charging of the actuator over time, FIG. 2 a further exemplary embodiment of a curve for current fed to the actuator, FIG. 3 a block diagram of a device for controlling a capacitive actuator, FIG. 4a a first exemplary embodiment of a control unit, and FIG. 4b a second exemplary embodiment of a control unit.
Figure 2:
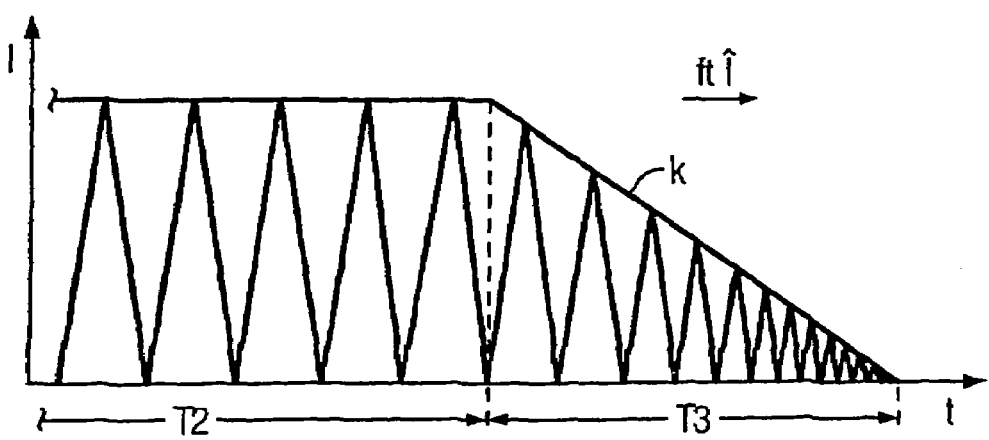

FIGS. 1 and 2 show the curve for a current I fed to an actuator. The amount of charge Q stored by the current I in the actuator is also plotted as a function of the time t in FIG. 1.

The actuator involved here is a capacitive actuator, especially a piezoelectric actuator P, as is used to actuate an injection valve. Such injection valves are used in internal combustion engines for example.

The upper part of FIG. 1 shows the curve of the current I fed to the actuator. In this case triangular current pulses PU with a pulse duration Tp adjoin each other. The maximum amplitudes Î1 to În in this case follow a control curve k.

The shape of the control curve k corresponds to a trapeze. During a first time T1 the maximum amplitudes În of the current I rise from a predefined minimum ÎminT1, here 0, to a predefined maximum ÎmaxT1. This maximum ÎmaxT1 is selected as a result of the desired charge Q of the actuator P at the end of the charge phase (T1+T2+T3) from a predefined characteristic data field. The characteristic data field can for example contain the assignment of different parameters of the internal combustion engine, such as engine speed and/or load for required volume of fuel and thereby for desired charge Q. This characteristic data field can for example be determined empirically or can also be computed. The change in travel Δd at the actuator P corresponds in this case to the charge Q fed to the actuator P. The equation then applies for the charge Q.

$$Q = \int I(dt).$$

The timing of the charge Q stored in the actuator P over the time t is plotted in the lower part of FIG. 1. During the first time T1 the amount of charge Q stored in the actuator P rises in proportion to t2.

During a second period of time T2 the maximum amplitude of the current pulse PU remains constant. Current pulses PU with a maximum amplitude ÎT2 and a pulse width Tp follow on directly from one another. Here ÎT2 approximately corresponds to the maximum current ÎmaxT1 of the period T1. During this period T2 the amount of charge Q fed to the actuator P rises in proportion to the time t.

In the last section T3 the amplitude În of the current pulses PU reduces from a predefined maximum ÎmaxT3 to an also predefined final value ÎminT3, here 0. Here ÎmaxT3 approximately corresponds to the maximum amplitude ÎmaxT1 which occurs in the period T1. The amount of current Q fed to the actuator P behaves during this period T3 in proportion to $(t_3-t)^2$.

The periods T1 and T3 are selected here so that a sufficient number of pulses PU are present in T1 or T3. Accordingly a switching frequency of $$\int p = \frac{1}{2Tp}$$

is selected.

Preferably around 5 to 10 pulses should occur within the rising or the falling edge of the curve. The switching frequency ft of a final stage E controlling the actuator must be selected accordingly. By suitable selection of the pulse width Tp, a sufficient averaging of the quantizing induced by the pulse width Tp is made possible and the amount of charge is controlled in a linear manner over the entire charge time T1+T2+T3.

The pulse width Tp can remain constant during the period T1, T2 and T3 of the control.

To achieve a linear control of the travel change Δd at actuator P, the amount of charge fed to the actuator is primarily achieved by changing the second period T2. In this case the falling ramp which forms the envelope curve of the amplitudes Î during the third period T3 is shifted in time, the third period T3 remains unchanged.

An alternative embodiment of the current I controlling the actuator P is shown in FIG. 2. Here the pulse width Tp is reduced during the period T3 and thus the switching frequency ft increased.

Figure 3:
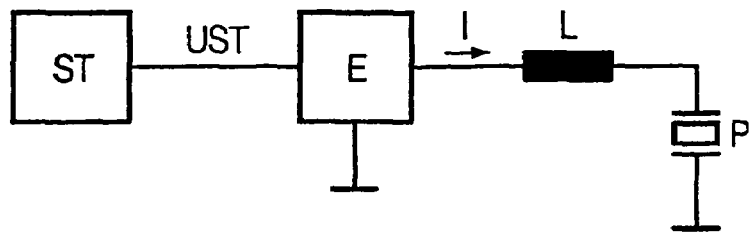

FIG. 3 shows a block diagram of an exemplary embodiment of a device for controlling an actuator. The actuator, here a piezoelectric actuator P, is connected via an inductor L to a final stage E. The final stage E delivers a current I via the inductor which charges the piezoelectric actuator. The final stage E can be embodied as a conventional switching converter, for example as a buck-boost-, flyback or SEPIC converter. The final stage E delivers, depending on a control voltage UST which is provided by a control unit ST, the current I which charges or discharges the piezoelectric actuator P. The direction of the current I depicted in FIG. 3 shows the current direction for a charging process.

Figure 4A:
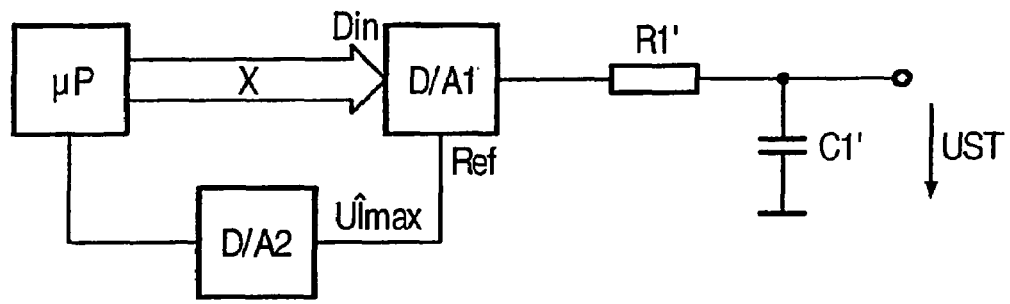

FIG. 4a shows a first exemplary embodiment of a control unit ST. This unit has a digital-analog converter, preferably a fast multiplying digital-analog converter D/A1 with a downstream lowpass filter R1', C1'. A predefined value X is fed to the digital-analog converter D/A1 at a digital input Din and a control voltage UÎmax specifying the maximum amplitude Îmax of the current is fed to a further input Ref. The applied control voltage UÎmax is then multiplied by the set digital value X and output at the output as control voltage UST, so that the digital-analog converter operates like a precise digital potentiometer. Both the predefined value X and also the maximum amplitude are provided by a microcontroller μC. In this case the control voltage UÎmax is generated from the digital information of the microcontroller μC by a second digital-analog converter D/A2. The control signal UST thus generated is fed via the lowpass filter formed from the resistor R1' and the capacitor C1' to the final stage E. Thus the envelope curve k can be predefined without the timing activation of the actuator P being changed by the final stage.

Figure 4B:
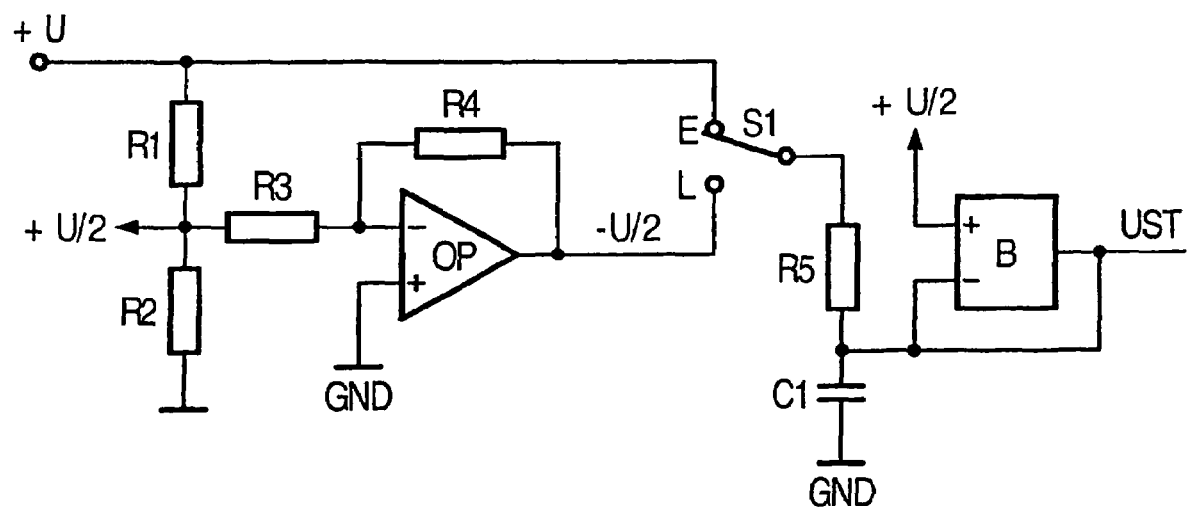

FIG. 4b shows an exemplary embodiment of a circuit arrangement constructed from analog components for creating the control signal UST. The circuit arrangement shown in this figure features on one side a charge capacitor C1 connected to ground GND, which is connected on the other side via a voltage limiter B to the output UST of the circuit arrangement.

The voltage limiter B is connected at the non-inverting input + to a voltage U/2 corresponding to the voltage to be limited. The inverting input − is connected to the side of the capacitor C1 facing away from ground. The output UST of the voltage limiter B is also electrically connected to this terminal of the capacitor C1. The capacitor C1 is further electrically connected via a resistor R5 and a selection switch S1 (for switch setting discharge "E") to the supply voltage U. In a second switch setting Charge "L" of the switch S1 the capacitor C1 is connected via the resistor R5 to the output of an operational amplifier OP connected as an inverting voltage amplifier. The operational amplifier OP is connected by its non-inverting input + to ground GND and by its inverting input − via a resistor R3 to the supply voltage U halved here by a voltage divider R1, R2 (R1=R2). The output of the operational amplifier OP is connected via a further resistor R4 back to its inverting input.

Here the ramp of the control signal UST is created by the capacitor C1 being charged in switch position L and subsequently discharged in switch position E. The function of the current limiter B is to limit the discharge current of the capacitor C1 so that the control signal UST is located in the linear range of the discharge voltage of the capacitor C1. Instead of the RC element R5, C1 an ideal integrator can also be used however.

I claim:

1. A method for controlling an actuator, including a piezoelectric actuator, which comprises the steps of:
    charging or discharging the actuator in at least three stages, each of the three stages having a defined duration of a current further defined by the steps of:
      during a first duration, increasing a maximum amplitude of the current from a predefined minimum to a predefined first maximum;
      during a second duration, keeping the maximum amplitude of the current substantially constant;
      during a third duration, lowering the maximum amplitude of the current from a further predefined maximum to a further predefined minimum; and
    adjusting an amount of charge for charging and discharging the actuator by adjusting the second duration.

2. The method according to claim 1, which further comprises selecting the first maximum in accordance with an amount of charge to be fed to the actuator.

3. The method according to claim 1, which further comprises selecting the second duration in accordance with an amount of charge to be fed to the actuator.

4. The method according to claim 2, which further comprises reading out the first maximum and/or the second duration depending on a predefined length change from a characteristic data field.

5. The method according to claim 1, wherein the maximum amplitudes lie on an envelope curve which, over the first, second and third durations has substantially a shape of a trapeze.

6. The method according to claim 1, which further comprises providing the current to be intermittent.

7. The method according to claim 1, which further comprises forming the current to be made up of a series of pulses, with a maximum amplitude corresponding in each case to the maximum current of the relevant pulse.

8. The method according to claim 7, which further comprises forming the pulses in triangular shapes.

9. The method according to claim 1, wherein amplitudes of the current increase without pausing after a predefined minimum has been reached.

10. The method according to claim 1, wherein the current is provided by a final stage depending on a control voltage, with the control voltage being provided by a digital-analog converter.

11. A device for controlling an actuator, including piezoelectric actuators, the device comprising:
    a final stage having a control input; and
    a control unit providing a control voltage to operate said final stage, the control voltage rising during a first time period from a predefined minimum to a predefined maximum, remaining constant during a second time period and falling during a third time period from a further predefined maximum to a predefined final value; and
    said control unit adjusting a charge for operating the actuator by adjusting a length of the second time period.

12. The device according to claim 11, wherein said control unit has a digital-analog converter providing the control voltage.

* * * * *